United States Patent [19]
Tada et al.

[11] Patent Number: 5,296,974
[45] Date of Patent: Mar. 22, 1994

[54] LIGHT CONTROLLING DEVICE AND PROCESS FOR CONTROLLING LIGHT TRANSMISSION

[75] Inventors: Hiroaki Tada, Kobe; Yasuhiro Saito, Nishinomiya; Masahiro Hirata, Takatsuki; Masato Hyodo, Kobe; Hideo Kawahara, Kawanishi, all of Japan

[73] Assignee: Nippon Sheet Glass Co., Ltd., Osaka, Japan

[21] Appl. No.: 913,173

[22] Filed: Jul. 14, 1992

[30] Foreign Application Priority Data
Jul. 16, 1991 [JP] Japan .................. 3-175567

[51] Int. Cl.$^5$ ............................................. G02B 5/22
[52] U.S. Cl. ................................ 359/885; 359/228; 359/601; 359/267; 359/296; 428/323
[58] Field of Search ............... 359/885, 886, 227, 228, 359/229, 230, 45, 46, 47, 51, 52, 84, 601, 613, 614, 265, 267, 270, 271, 296; 356/335, 336; 428/323, 324

[56] References Cited

U.S. PATENT DOCUMENTS

| | | | |
|---|---|---|---|
| 3,257,903 | 6/1966 | Marks | 88/61 |
| 3,612,657 | 10/1971 | Sawyer | 359/296 |
| 4,093,534 | 6/1978 | Carter et al. | 359/296 |
| 4,345,820 | 8/1982 | Chabrolle | 359/296 |
| 4,394,068 | 7/1983 | Pape et al. | 359/267 |
| 4,442,019 | 4/1984 | Marks | 359/296 |
| 4,627,689 | 12/1986 | Asher | 359/886 |
| 4,657,349 | 4/1987 | Labes et al. | 359/296 |
| 4,671,617 | 6/1987 | Hara | 359/267 |
| 5,007,714 | 4/1991 | Nishimura et al. | 359/228 |
| 5,131,736 | 7/1992 | Alvarez | 359/886 |
| 5,147,716 | 9/1992 | Bellus | 428/323 |

*Primary Examiner*—Loha Ben
*Attorney, Agent, or Firm*—Varndell Legal Group

[57] ABSTRACT

A light controlling device comprising a pair of substrates, a viscoelastic or elastic dispersing medium containing fine particles aligned in an approximately constant direction, and a way for applying a shear stress to the viscoelastic or elastic material. The device can control light transmission in non-stage by applying a shear stress to the viscoelastic or elastic material to incline the direction of the alignment of particles with respect to the incident light.

20 Claims, 5 Drawing Sheets

LIGHT CONTROLLING DEVICE AND PROCESS FOR CONTROLLING LIGHT TRANSMISSION

BACKGROUND OF THE INVENTION

The present invention relates to a light controlling device having an excellent controllability of light transmittance and a process for controlling light transmission using the device. More particularly, the invention relates to a light controlling device using a light-transmissive non-liquid medium for dispersing particles therein, and a process for controlling light transmission using the device.

In recent years, multistory buildings increase more and more, and moreover, the windows have become a large size. At least 25% of the energy consumption in office buildings is energy that comes in or out as a light or heat through windows. Accordingly, from the viewpoint of energy saving or effective utilization of energy, control of light transmission of window glasses, particularly development of large-area light controlling device applicable to windows, is demanded. Also, at present where the number of automobiles increases owing to rise of motorization, and in addition, where most of automobiles are equipped with air conditioner with trend toward high-class motorcars, it is demanded, from the viewpoint of effective utilization of energy, to develope a light controlling device suitable for windows of electric motorcars which particularly requires severe restriction of energy consumption.

In order to meet the demands, there has been developed light controlling devices, e.g. devices for electrically controlling the absorbance or reflectance to sunlight intended to reduce air conditioning load. Studies of some electromagnetic optical elements have also been made for the purpose of application to light controlling devices.

One of light controlling devices which have hitherto been studied is an electrochronic element (EC element), as known from C. M. Lampert, Solar Energy Mater., Vol. 6, No. 1, 1981. The light controlling device using the EC element utilizes a change in spectrum resulting from an electrochemical oxidation-reduction reaction of a tungsten oxide film or the like, namely a large absorption or reflection of tungsten bronze to light in the region of visible rays to near infrared rays.

As another light controlling device, there is known a device using a suspension of anisotropic dipole particles in a liquid dielectric medium (the device being thereinafter referred to as "DPS device"). The DPS device basically composed of a suspension of fine particles having a shape anisotropy, e.g. needle-like or plate-like particles, in a liquid dielectric, which is sandwiched between a pair of glass substrates having a transparent electrically conductive film. The DPS device utilizes a change in light transmittance resulting from varied orientation of dispersed particles in response to application of an electric field to the suspension. The fine particles orient in the state that their major axes are parallel to the direction of the electric field when the electric field is applied to the suspension, thus transmitting light well (open state). When the action of electric field is released, the orientation of particles is released by Brownian movement and the particles orient randomly, thus decreasing light transmission (closed state). This state change in electromagnetic optical devices is called a switching action.

The electromagnetic optical devices using the DPS element began to be developed from around the end of 1960 for the original purpose of applying to display element, and proposals relating thereto are made, for example, in U.S. Pat. No. 3,257,903 and Japanese Patent Publication Kokai No. 61-69038. This electromagnetic device can be used as light controlling device since light transmittance changes under an electric field.

The light controlling device using the EC element has the defect that because the EC element is electric current actuation type, it causes IR drop and an increase in the area of the device results in a marked decrease in speed of response. It has also a problem owing to working principle that the EC element does not substantially operate at low temperatures. These problems are a serious obstacle to application to large-area light controlling device.

The light controlling device using the DPS element shows a large charge of light transmittance in the initial stage of use and is relatively easy to produce devices having a large surface area because of electric field actuation type. However, in general, this device has the problem that because fine particles are dispersed in a liquid medium, the particles coagulate and precipitate, thereby causing color irregularity in the vertical direction, decrease in degree of change of light transmittance and worsening of switching action.

Also, as a related art, a multi-directional light control film including needle-like particles having their major axes aligned in parallel within a matrix is proposed in EP-A-0,403,116. The alignment of the needle-like particles is completely locked in the matrix. Accordingly, the proposed multi-directional light control film has an anti-glare effect, but does not have an ability of arbitrarily controlling light transmittance, i.e. so-called light controlling ability.

It is an object of the present invention to provide a light controlling device of a different type from electric current actuation type and electric field actuation type, namely a device which can control light transmission without applying an electric current or an electric or magnetic field.

A further object of the present invention is to provide a light controlling device which has no problem resulting from agglomeration or precipitation of fine particles dispersed in a light transmissive dispersing medium.

Another object of the present invention is to provide a process for controlling light transmission without application of an electric current or an electric or magnetic field.

These and other objects of the present invention will become apparent from the description hereinafter.

SUMMARY OF THE INVENTION

It has been found that when fine particles are aligned in a predetermined direction in a light transmissive dispersing medium of a viscoelastic body or an elastic body and a shear stress is applied to the viscoelastic or elastic body, light transmittance can be controlled to a desired degree without causing deterioration of the light controllability owing to the precipitation of fine particles.

In accordance with the present invention, there is provided a light controlling device comprising a pair of substrates, a viscoelastic or elastic material containing fine particles aligned in a predetermined direction with respect to the substrates, and a means for applying a shear stress to the viscoelastic or elastic material.

The viscoelastic or elastic material layer containing the aligned particles is formed by preparing a mixture of fine particles and a solidifiable liquid dispersing medium, orienting the particles in a predetermined direction and solidifying the liquid dispesing medium to a viscoelastic or elastic material in the state of the particles being oriented.

It is desirable that the particles are uniformly dispersed in the liquid dispersing medium and are locked in the dispersed and aligned state in the viscoelastic or elastic material without causing precipitation. It has also been found that the fine particles are prevented from sticking or depositing onto the substrates prior to the solidification of the liquid dispersing medium by providing a layer of a polyorganosiloxane or a polyimide on the surface of the substrate, whereby the degree of change in light transmittance is increased.

In a preferred embodiment of the light controlling device according to the present invention, a layer for preventing particle deposition is provided on the inner surface of at least one substrate.

The light controlling device of the present invention can control the light transmittance in multistage by changing the amount of displacement imposed to the substrates to provide a shear stress to the viscoelastic or elastic material layer sandwiched by the substrates. It is also possible to control the light cutting off direction by varying the stress applying direction. Since the suspending medium is a solid or semi-solid, no agglomeration or precipitation of particles occurs and the performance is stable. Also, leakage of dispersing medium and the scattering at breakage of the device do not occur. The device has high safety and reliability. Since coating means is adoptable to the preparation of the viscoelastic or elastic layer, it is easy to produce the devices having a large surface area.

The light controlling device according to the present invention can be used in a wide range of purposes, e.g. window materials for buildings and automobiles.

DETAILED DESCRIPTION

An embodiment of the light controlling device according to the present invention will be explained with reference to the accompanying drawings. It is to be understood, however, that the present invention is not limited to the embodiment.

Figure 1:
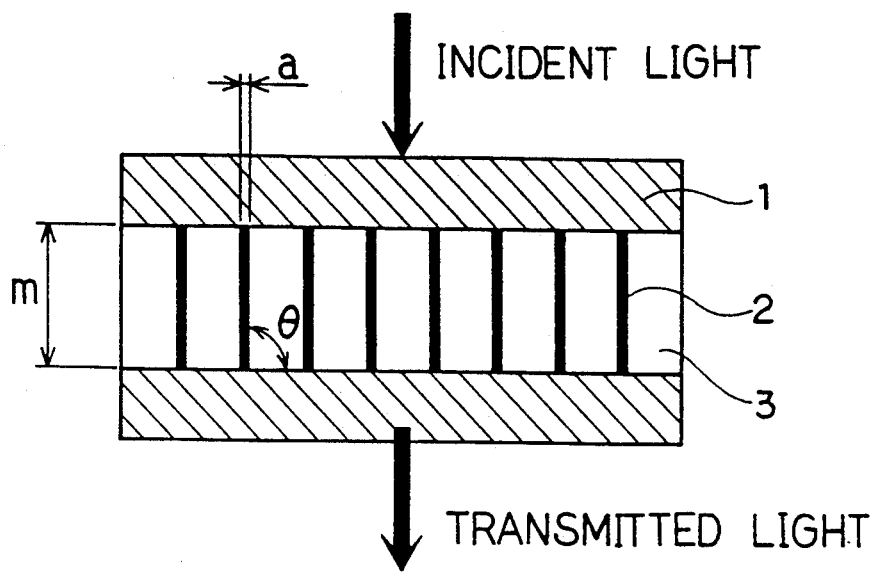
FIG. 1 is an illustrative section view showing a high light-transmitting state (open state) of a light controlling device according to the present invention in the absence of a shear stress.
Figure 2:
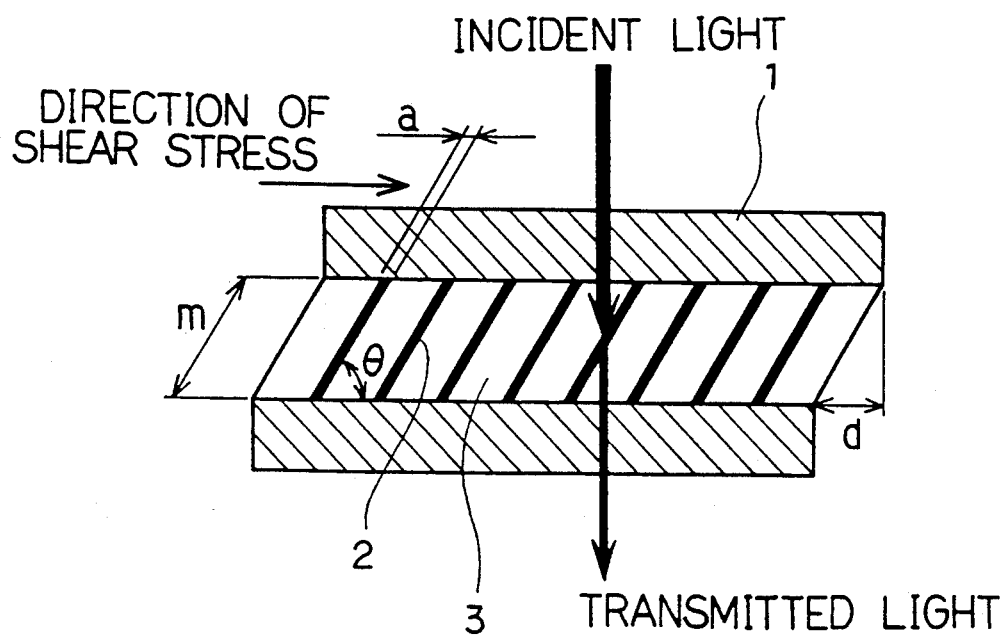
FIG. 2 is an illustrative section view showing a low-transmitting state (closed state) of a light controlling device containing light-absorptive particles according to the present invention in the presence of a shear stress.

FIG. 1 shows an embodiment of the light controlling device according to the present invention where fine particles or agglometrates of linearly chained fine particles are aligned in parallel with each other such that the angle $\theta$ of the longitudinal axial direction of each particle or agglometrate to the substrate is 90°, and no shear stress is applied. In FIG. 1, numeral 1 is a substrate, and a dispersing medium 3 of a viscoelastic or elastic material containing fine particles 2 is placed between a pair of substrates 1. FIG. 2 shows a state of the device of FIG. 1 to which a shear stress is applied.

Fine particles present in the viscoelastic or elastic dispersing medium may be in the form of individual particle or a collection of a plurality of fine particles. Usually, fine particles are present in the form of a plurality of agglomerates or blocks, each consisting of a plurality of electrically or magnetically, linearly chained particles (hereinafter referred to as "block").

As the substrate 1, any of materials used conventionally for light controlling devices, display devices or the like can be used without any restriction in the present invention. Materials having a high transmittance of light are preferred from the viewpoint of controllability of light transmittance over a wide range. Representative examples of light transmissive materials suitable as the substrate are glasses such as soda lime glass, and molded articles of polymers such as polyethylene terephthalate, polyvinyl butyral and a modified ethylene-vinyl acetate copolymer. The shape and size of the substrate 1 are suitably determined in accordance with the purposes or the like.

In case of using an electrically responsive viscous liquid as a suspension of fine particles in the preparation of the device, application of an electric field to the suspension electrically polarizes each particle to form dipole. Under appropriate conditions, attractive force in the direction of the external electric field is operated between the particles, developing a chain. Accordingly, in case of using a suspension of particles susceptible to an electric field, alignment of particles 2 perpendicular to the substrate as shown in FIG. 1 can be easily achieved by application of an electric field. Accordingly, in such a case, it is preferable to provide a transparent electrically conductive film onto each of inner surfaces of two sheets of substrate 1 arranged in parallel. The transparent electrically conductive film is not particularly limited, and those conventionally used in light controlling devices or the like can be used in the present invention. Representative examples of the transparent electrically conductive film are, for instance, $SnO_2$ film and ITO (indium-tin-oxide) film. The thickness of the conductive film is not particularly limited. It is preferable, however, that the film thickness is optically designed so as to minimize the reflection of the device. An instance of such a film thickness is 180 nm when the conductive film is an $SiO_2$ film.

If the fine particles are an electrically conductive material, it is effective to cover the particles and/or the transparent electrically conductive film with an insulating film.

As the fine particle 2, any particles can be used in the present invention so long as they are polarized or show a magnetic property in the presence of an electric field and are susceptible to an electric or magnetic field to align in their liquid suspension in the direction of the electric or magnetic field. Preferred in obtaining a good light controllability are particles having a high absorbance or reflectance to light, particularly particles having an absorption coefficient of not less than $1\times10^4$ $cm^{-1}$ and particles having a reflectance on the same level as metals. If the absorbance of particles is high, a large portion of incident light is absorbed by the particles in the closed state of the device, so light transmittance is greatly decreased, thus enabling to control transmission of sunlight over a wide range. Similarly, if the reflectance of particles is high, a large portion of incident light is reflected in the closed state of the device, so light transmittance is greatly decreased, thus enabling to control transmission of sunlight over a wide range.

Representative examples of the particles are, for instance, graphite, $TiO_x$, $TiO_xN_y$, mica covered with titanium dioxide, mica covered with $TiO_x$, mica covered with $TiO_xN_y$, glass flakes covered with titanium dioxide, glass flakes covered with $TiO_x$, glass flakes covered with $TiO_xN_y$, $\gamma$-iron(III) oxide, a metal salt of titanic acid, iron cobalt, magnetite, barium-ferrite, chromium(IV) dioxide, and other particles, e.g. mica or glasses covered with various metals such as gold and silver. X in $TiO_x$ is selected from the range of $1 \leq X \leq 2$, preferably $1.40 \leq X \leq 1.80$ from the viewpoint of the absorption coefficient of the particles. In other words, among $TiO_x$, preferred are those having and absorption coefficient of at least $5\times10^3$ $cm^{-1}$, especially at least $1\times10^4$ $cm^{-1}$. Also, with respect to $TiO_xN_y$, those within the range of $1.37 \leq X+y \leq 1.95$ and $0.15 \leq y \leq 0.92$ are preferred from the viewpoint of the absorption coefficient, and $TiO_xN_y$ within this range has an absorption coefficient of at least $5\times10^3$ $cm^{-1}$.

The fine particles used in the present invention are not always required to have a shape anisotropy. Even if particles have a small anisotropy or no anisotropy, they can be used in the present invention so long as they are susceptible to an electric or magnetic field in a viscous suspension thereof, because the particles can form chains of fine particles (a plurality of blocks 2, each block 2 consisting of a plurality of chains of fine particles).

However, if the fine particles have a shape anisotropy, chains of fine particles, namely columnar blocks 2 of particles, are easily formed because attraction between particles becomes large when an external field of force is applied thereto. Also, if the particles have a shape anisotropy, light transmittance controllabilty is increased as understood from comparison between FIGS. 1 and 2.

The degree of shape anisotropy is preferably such that the length of minor axis of a particle is not more than 0.1 $\mu$m, and the aspect ratio, i.e. the ratio of the length of major axis to the length of minor axis, is at least 3.

As the viscoelastic or elastic dispersing medium 3, there can be used any of viscoelastic or elastic materials having properties such that a shearing deformation (d shown in FIG. 2) of submicrons to several tens of microns ($\mu$m) occurs when a shear stress of the degree not to break a substrate is applied to the substrate, and the original alignment of particles can be kept when the stress is released. It is preferable that the shear modulus (G) of the viscoelastic or elastic material measured at room temperature at a frequency of 1 Hz is form $1\times10^2$ to $1\times10^7$ dynes/$cm^2$, especially from $1\times10^3$ to $1\times10^5$ dynes/$cm^2$. When the shear modulus is less than $1\times10^2$ dynes/$cm^2$, the viscoelastic or elastic material is too soft and it is hard to keep the alignment of the particles. When the shear modulus is more than $1\times10^7$ dynes/$cm^2$, a very large force is required to shift the substrate and, therefore, the device is hard to operate or use.

The alignment of fine particles is conducted in a liquid suspension of the particles having a viscosity sufficient to prevent the particles from precipitating, and thereafter the viscosity of the liquid suspension is raised to a viscosity sufficient to lock or keep the particles in aligned positions. Accordingly, it is convenient to use, as liquid dispersing medium, aqueous or organic solvent solutions of polymers or monomers which are solidifiable by evaporation of solvents, crosslinking or polymerization.

As preferable viscoelatic or elastic materials, there are mentioned, for instance, crosslinked products of inorganic or organic polymers such as thermally curable polymers, photo-curable polymers, electron beam curable polymers, radiation-curable polymers and plasma-curable polymers, and other polymer having a three dimentional net work structure based on hydrogen bond, elecrostatic interaction or coordination bond. These polymers may be used alone or in admixture thereof.

Representative examples of the viscoelastic or elastic material are, for instance, polymerization products of various vinyl monomers and crosslinking monomers such as divinyl compounds, polyacrylic acid, polymethacrylic acid, polyacrylamide, a reaction product of a hydroxyl group-containing polymer and an aldehyde, a mixture of polyvinyl alcohol and a 2-oxazolidine compound, polyethylene, an $\alpha$-substituted polymer, polyvinylidene fluoride, polytetrafluoroethylene, a nylon, polyvinyl fluoride, intermolecular complex of polyacrylic acid and polyvinyl alcohol, polyvinyl alcohol-$Cu^{2+}$, polyacrylic acid-$Fe^{3+}$, polyacrylic acid-$Cu^{+2}$, and a polyorganosiloxane.

When the light controlling device is used as the window material for buildings or vehicles, the device directly contacts the external atmosphere and, therefore, it is necessary that the device stably operates at a temeprature of $-20°$ C. to $80°$ C. For satisfying this requirement, it is preferable that the modulus of viscoelasticity of the viscoelastic material or the modulus of elasticity of the elastic material is low in dependency on temperature. From such a point of view, polyorganosiloxane, a heat-curable polyorganosiloxane and a photo-curable polyorganosiloxane are particularly preferred as the viscoelastic or elastic material. They are also superior in weather resistance.

The viscoelastic or elastic materials as mentioned above deform in accordance with a degree of a shear stress applied, and can restore to the original state when the shear stress is released. Since the viscoelastic or elastic materials can perform the deformation and the restoration in a good repeatability, the device of the present invention can repeatedly control light transmission in a good repeatability.

The light controlling device of the invention includes a means for applying a shear stress to the viscoelastic or elastic material. For example, an actuator which can convert an electric signal to a mechanical movement is used as the stress applying means, whereby a desired shear stress can be obtained by controlling the voltage.

Fine particles are dispersed in a viscous solidifiable liquid, and an electric or magnetic field is applied to the resulting suspension to orient the particles to a desired direction. The liquid suspension is then solidified, in the state that the electric or magnetic field is applied, to convert into a viscoelastic or elastic material 3, thereby locking or holding the fine particles in the oriented arrangement. The fine particles 2 in the viscoelastic or elastic material 3 orient and align in an approximately constant direction with respect to the substrate 1, though the angle of orientation of each particle deviates to some extent. In many cases, the particles in the viscoelastic or elastic material form blocks in the oriented and aligned state, each block 2 consisting of a plurality of aligned chains of particles. The term "constant direction" as used herein means not only the state that the particles or blocks 2 are oriented and aligned in an absolutely constant direction, but also the state that the particles or blocks 2 are oriented and aligned in a generally constant direction, and as a whole in a constant direction.

In order to efficiently achieve the control of light transmittance by application of a shear stress, it is preferable that the content of fine particles in the viscoelastic or elastic material layer 3 is from 0.07 to 7.0% by volume, especially from 0.7 to 2.3% by volume. Also, it is preferable that the thickness "m" of the viscoelastic or elastic material layer is from 5 to 100 $\mu$m, especially from 10 to 50 $\mu$m.

The minor axial size ("a" shown FIG. 1) of the particle or block 2 is not more than 10 $\mu$m, preferably not more than 4 $\mu$m. Also, it is preferable that the density of the number of blocks are at least $2.0 \times 10^5$ blocks/cm$^2$, especially at least $7.0 \times 10^5$ blocks/cm$^2$.

The medium for dispersing fine particles used in the present invention is a solid or semi-solid material and, therefore, there is no problem such as scattering at break and leaking as encountered in conventionally used liquid suspensions. Light transmittance can be controlled in non-stage by varying the shear stress applied to the non-liquid dispersing medium, and the controllability of solar energy transmission is also very high.

The alignment of fine particles in a predetermined direction with respect to a substrate is achieved by two different methods, one being a method where a voltage is applied, and the other being a method where a magnetic field is applied.

In case of the former method using an electric field, the light controlling device is produced, for instance, by sandwiching a solidifiable liquid suspension of fine particles polarizable by an electric field with a pair of substrates having electrodes on their inner surfaces, and solidifying the suspension to a viscoelastic or elastic material with applying a voltage between the substrates during the solidification.

In this method, firstly, one or more kinds of fine particles are mixed with a solidifiable liquid capable of converting into a viscoelastic or elastic material to provide a liquid suspension to which a catalyst may be added as occasion demands. The liquid suspension is then coated on a substrate, for instance, by screen printing, and another substrate is placed on the coated suspension so as to form a predetermined spacing "m" between a pair of the substrates. A voltage is applied between the substrates to orient the particles in the liquid suspension, and under the application of voltage, the liquid suspension is solidified in the particle oriented state by a suitable means, e.g. heating, to convert into a viscoelastic or elastic material, thereby locking the particles in oriented or aligned positions.

The thickness of the layer of the viscoelastic or elastic material is determined by the spacing between the substrates. The thickness of this layer can be evenly maintained, for instance, by adding spherical particles having a uniform particle size as a spacer to the liquid suspension. In this case, the spacing between the substrates is determined by the diameter of the spacer.

The voltage to be applied varies depending on the viscosity of the liquid suspension and the particle chain forming ability of the fine particles. In general, an electric field of not less than $10^4$ V/cm is sufficient.

The solidification of the liquid suspension is carried out by allowing to stand, heating, light irradiation, electron beam irradiation, radiation irradiation, plasma irradiation, or other suitable means for the solidification, while applying a voltage to the liquid suspension of particles sandwiched with a pair of substrates through electrodes provided on the surfaces of the substrates.

In order to obtain a good adhesion between the substrates and the solidified suspension, it is preferable to carry out the solidification of the liquid suspension in the state of being sandwiched with the substrates. Accordingly, it is convenient to use a heat-curable or photo-curable polymer solution as a solidifiable liquid for preparing the liquid suspension of fine particles. Further, from the viewpoints of weather resistance and temperature dependency of elastic modulus, a heat-curable polyorganosiloxane and a photo-curable polyorganosiloxane are particularly preferred.

Another method is a method utilizing a magnetic field. In this method, a liquid suspension containing magnetically orientable particles is placed between a pair of substrates, and is then solidified to a viscoelastic or elastic material with applying the magnetic field between the substrates. This method is carried out in the same manner as the method utilizing application of a voltage except that a megnetic field is applied to the suspension of magnetic particles.

The method using a magnetic field has the advantage that the angle $\theta$ of the columnar block of chains of particles to the substrate can be suitably determined by selecting the direction of the magnetic field. In contrast, in the method applying a voltage, the angle $\theta$ is inevitably 90°.

The application of magnetic field is achieved, for instance, by arranging two series-connected solenoids in parallel and utilizing the parallel magnetic field produced between them. In that case, by selecting the angle of the magnetic field to the substrate and then solidifying the liquid suspension of particles, it is possible to obtain the viscoelastic or elastic material containing the particles or columnar blocks of particles aligned in the desired direction to the substrate.

The magnetic field strength varies depending on the kind of magnetic particles used. For instance, in case of γ-iron(III) oxide, a magentic field of at least 5 kOe is required for obtaining a good alignment of particles.

The solidifiable liquid suspension of fine particles may contain a slight amount of a colorant such as dye so long as the light transmittance is not markedly impaired.

A part of the fine particles in the liquid suspension may stick or deposit onto the surface of the substrates during the solidification of the suspension, thus resulting in decrease of a width of change in light transmittance between the open state and maximum closed state of the device, namely decrease of the controllable range of light transmittance. It has been found that a layer of a polyorganosiloxane or a polyimide formed on at least one inner surfaces of a pair of the substrates is effective for preventing the fine particles from sticking or depositing onto the surface of the substrate.

Figure 6:
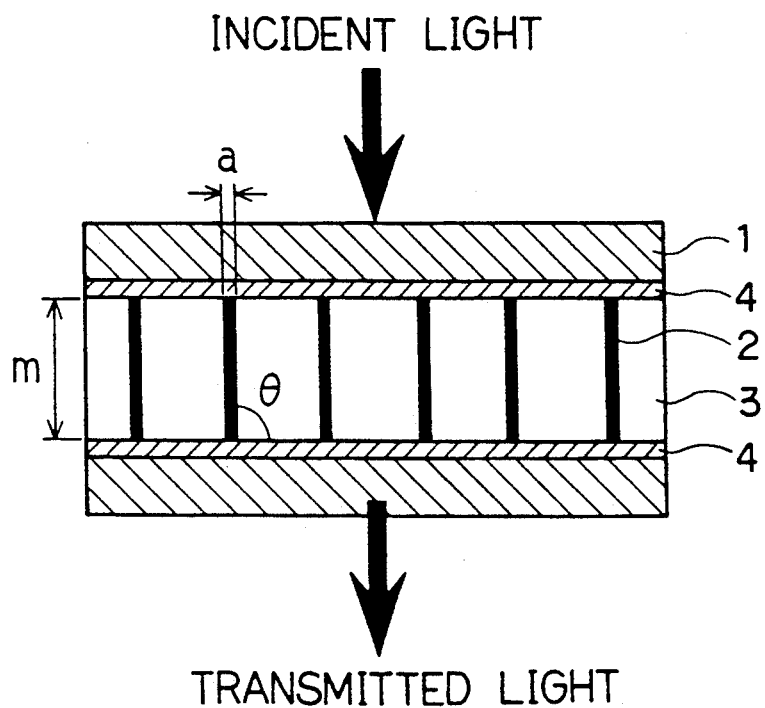
FIG. 6 is an illustrative section view showing another embodiment of the light controlling device according to the present invention wherein a particle deposition preventing layer is provided on each inner surface of a pair of substrates and no shear stress is applied to the device.

Accordingly, in another embodiment of the present invention, the light controlling device includes a particle deposition preventing layer 4 on at least one inner surface of the substrates 1, as shown in FIG. 6. For preventing the sticking or deposition of fine particles during the solidification of the liquid suspension, it is important to decrease the surface free energy between the substrate and the liquid suspension of particles. Accordingly, the polyorganosiloxane film formed on the surface of the substrate may be a monomolecular layer or a multimolecular layer.

The polyorganosiloxanes used for the prevention of sticking or deposition of particles are not particularly limted, and usual polyorganosiloxanes, e.g. polydimethylsiloxane and polydipenylsiloxane, and other known polyorganosiloxanes can be used in the present invention. Particularly preferred are polydimethylsiloxane or polydiphenylsiloxane having a reactivity with the substrate, for example, polydimethylsiloxane derivatives of the formulas:

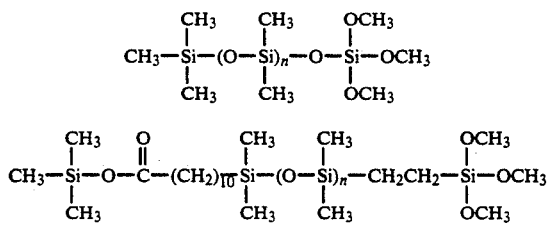

wherein n is an integer of 1 or more. The degree of the polymerization of the polyorganosiloxanes is not particularly limited.

Polyimides conventionally used for surface treatment of display panels of liquid crystal display devices can be used in the present invention without any restriction.

The particle deposition preventing layer is formed by known coating means such as dipping or printing.

According to the present invention, it is possible to easily produce light controlling devices having a large surface area, e.g. devices having a size of about 1 m×2 m.

Control of light transmission based on the light control device of the present invention is practiced by applying a shear stress to a viscoelastic or elastic layer by a means adapted for applying the shear stress.

Referring to FIGS. 1 and 2, FIG. 1 is a cross sectional view showing the open state of the light controlling device according to the present invention to which no shear stress is applied, and FIG. 2 is a cross sectional view showing the closed state of the device according to the present invention to which a shear stress is applied. Since the fine particles are in many cases present in the form of as columnar agglomerate (block) composed of a plurality of linearly chained particles, the particles are regarded as columnar agglomerates (blocks) of fine particles in the following explanation.

In case of the state shown in FIG. 1, the particles are aligned perpendicularly to the substrate. Since the light cutting off area based on the particles is small in this state, most of sunlight passes through the device.

When a shear stress is applied to the viscoelastic or elastic layer 3 containing the particles 2 in the state shown in FIG. 1, the major axes of particles 2 incline in the direction of the shear stress in a parallel relationship with each other. Since the light cutting off area of the device in this state is large, most of light is absorbed by the particles when particles having a high absorbance are used, or is reflected by the particles when particles having a high reflectance are used.

The amount of displacement of the substrate in the transverse direction for applying a shear stress to the viscoleastic or elastic layer 3 varies depending on the physical properties and thickness of the layer 3. For example, when the thickness of the layer 3 is about 20 μm, the light transmittance is decreased by 10 to 20% by displacement of at least 4 μm. Also, when the absorption coefficient of the particles is sufficiently high, the transmittance decreases in rough proportion to the amount of positional displacement of the substrate.

The device of the present invention includes a means for applying a shear stress such as an actuator, and the amount of displacement of the substrate can be easily controlled by controlling the voltage applied to the actuator connected to the substrate. When the shear stress is released, the particles return to the initial state as shown in FIG. 1. If the particles do not completely return to the initial state owing to stress relaxation of the viscoelastic or elastic material, the particles can be forced to return to the initial state by the actuator. This is important in keeping the switching performance of the device without being affected by stress relaxation of the viscoelastic or elastic material.

Since the device of the present invention performs light control in a manner as mentioned above, non-stage control of transmittance is possible by shifting the position of the substrate in a desired amount.

Figure 3:
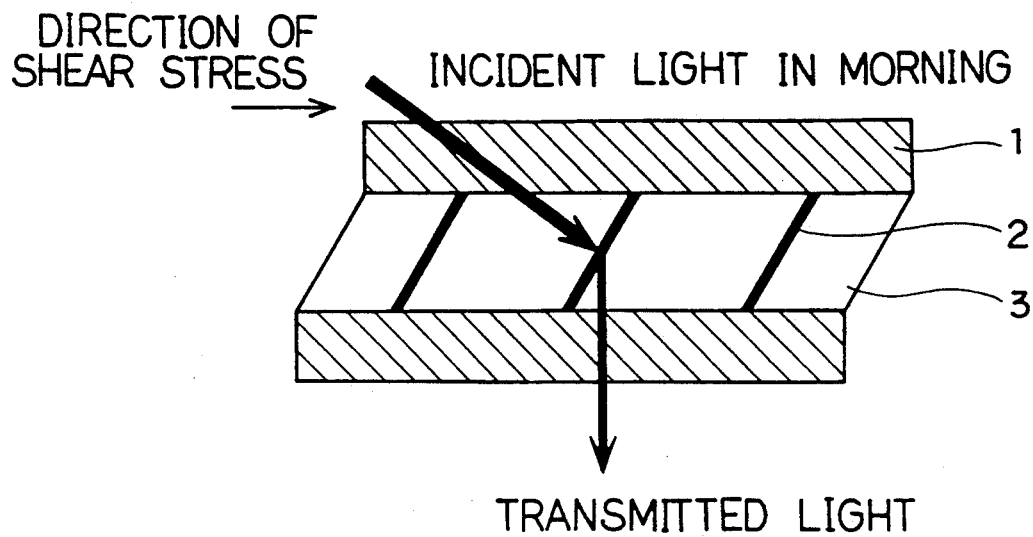
FIGS. 3 and 4 are illustrative section views showing the state of light transmission when a light controlling device according to the present invention is fabricated as a direction-variable light controlling device.
Figure 4:
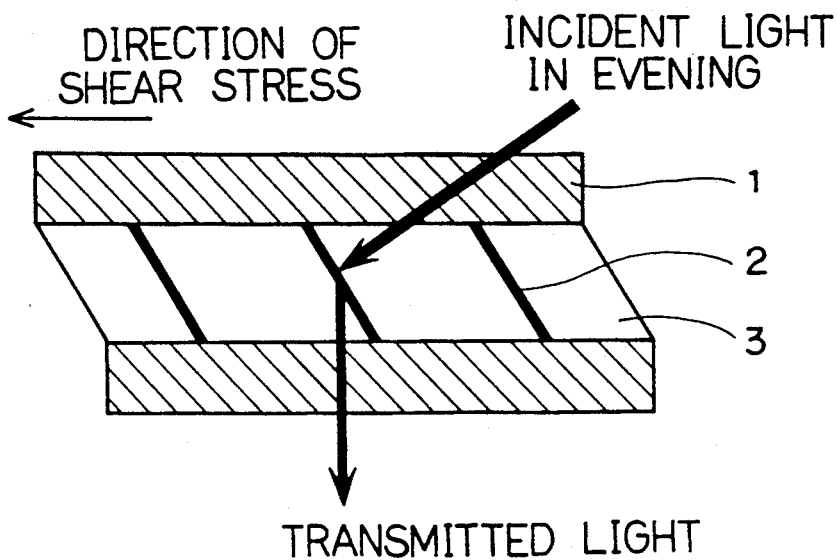
Figure 5:
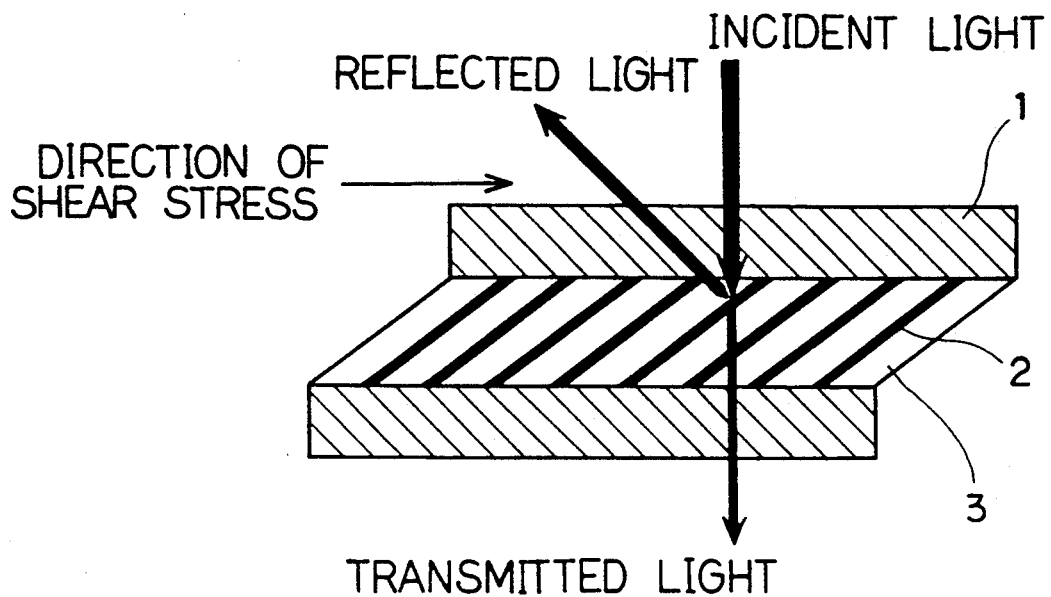
FIG. 5 is an illustrative section view showing a low light-transmitting state (closed state) of a light controlling device containing light-reflective particles according to the present invention in the presence of a shear stress.

Also, it is possible to select the light cutting off direction by changing the direction of shifting the substrate in accordance with the light incident direction. Referring to FIGS. 3 and 4 where the numerals are the same as in FIGS. 1 and 2, it is imagined that the device of the present invention is attached to a window facing the south.

FIG. 3 is a cross sectional view showing a manner of light control in the morning, and FIG. 4 is a cross sectional view showing a manner of light control in the light evening. The direct radiations of the sun can be effectively cut off by changing the direction of shifting the substrate depending on the direction of incident light, as shown in FIGS. 3 and 4.

The light controlling device of the present invention has a high controllability of light transmission such that the width of change in transmittance between the open state and the maximum closed state of the device is about 40% or more, and moreover, the width of change in transmittance scarcely changes even if the device is operated about $10^6$ times. The controllability of transmittance is on the same level as the inital width of change in transmittance of conventional liquid type DPS devices.

The light controlling device of the present invention can be suitably used for various purposes, for example, as window materials for buildings and automobiles.

The present invention is more specifically described and explained by means of the following Examples. It is to be understood that the present invention is not limited to the Examples.

EXAMPLE 1

Needle-like TiOxNy fine particles covered with a silica insulation coating and having an absorption coefficient of about $10^5$ cm$^{-1}$, a longitudinal axial length of about 0.5 μm and an aspect ratio of about 10 were added together with a small amount of spherical spacer particles having a diameter of 24 μm to a silicone gel raw material solution (two package composition KE1052 made by Shin-Etsu Chemical Co., Ltd. consisting of liquid A and liquid B to be mixed in a weight ratio of 1:1) to give a suspension having a fine particle content of about 3% by weight. The suspension was added drowise onto a glass substrate (50 mm×10 mm×1.1 mm) having an ITO film of 30±10 nm in thickness as an electrode and covered with a silica film of about 500 nm in thickness, and thereon was placed a facing glass substrate. The suspension sandwiched between the substrates was heated at about 50° C. for 1.5 hours to gel the suspension with applying a voltage of 60 V between the substrates.

The thus prepared solid type cell was observed by an optical microscope. It was observed that the needle-like particles were oriented and agglomerated to form columnar agglomerates (blocks) aligned parallel to each other and perpendicularly to the glass substrate, as shown in FIG. 1. The size of the minor axis of the columnar block ("a" shown in FIG. 1) was about 2 μm, and the longitudinal axial length of the columnar blocks was approximately equal to the spacing "m" between the substrates and was about 20 μm.

One of the substrates of the cell was fixed, and the other was connected to a probe of an actuator to provide a light control device controllable by voltage change. The visible ray transmitance 54.1% of the cell changed to 19.7% by application of a shear stress, thus 34.4% decrease in transmittance was confirmed. Also, it was confirmed that infinite variable transmittance can be obtained within the range between the above maximum and minimum transmittances by controlling the shear stress applied to the substrate.

This large change in transmittance is apparently based on the change in light absorption sectional area of the columnar blocks of fine particles resulting from shear deformation of the viscoelastic or elastic layer by shear stress applied thereto.

The complex modulus of elasticity of the silicone gel layer containing particles was measured by RDA-II model dynamic analyzer made by Rheometrix Corp. at room temperature and 1 Hz to give a value of $2.0 \times 10^4$ dynes/cm as modulus of shearing elasticity.

EXAMPLE 2

A solid type light controlling cell was prepared in the same manner as in Example 1 except that plate-like fine particles of TiO$_2$-covered mica having an average particle size of about 15 μm and an aspect ratio of about 10 (powder TP-690 made by Tayca Corporation) was used as reflective particles to give a suspension having a particle content of 2.76% by weight.

It was observed by an optical microscope that the plate-like particles were oriented and agglomerated to form columnar blocks aligned in a direction perpendicular to the substrate.

A light controlling device was fabricated by attaching an actuator to the cell in the same manner as in Example 1.

The visible ray transmittance changed from 87.8% % to 84.8% by application of a shear stress, and the change was 2.9%.

EXAMPLE 3

An ITO film having a thickness of 30±10 nm was formed on each of glass plates having a size of 50 mm×100mm×1.1 mm, and the glass plates having the ITO film were covered with a silica film having a thickness of about 500 nm to give glass substrates (A) used for fabrication of light controlling devices.

The thus obtained glass substrates (A) were surface-treated with (B) a polydimethylsiloxane having three methoxy groups at one molecular end of the formula:

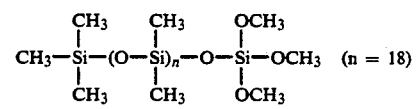

or with (c) a polydimethylsiloxane derivative of the formula:

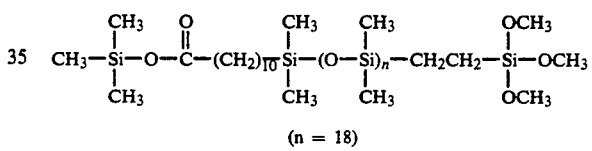

(n = 18)

in the following manner.

The glass substrates (A) were immersed for 2 hours in the polyorganosiloxane liquid (B) heated at 200° C., taken out and then washed with toluene to give treated substrates (B). On the other hand, the glass substrates (A) were immersed in the polyorganosiloxane liquid (C) heated at 150° C. and kept for 2 hours at that temperature with blowing nitrogen gas to give treated substrates (C).

Needle-like TiOxNy fine particles covered with a silica insulation coating and having an absorption coefficient of about $10^5$cm$^{-1}$, a longitudinal axial length of about 0.5 μm and an aspect ratio of about 6.5 were added together with a small amount of spherical spacer particles having a diameter of 24 μm to a silicone gel raw material solution (two package composition KE1052 made by Shin-Etsu Chemical Co., Ltd, consisting of liquid A and liquid B to be mixed in a weight ratio of 1:1) to give a suspension having a fine particle content of about 3% by weight. The suspension was added onto each of the non-treated substrate (A) and the treated substrates (B) and (C), and thereon was placed a facing glass substrate (A), (B) or (C). The suspension sandwiched between the substrates was heated at about 60° C. for 2 hours to gel the suspension with applying a voltage of 80 V between the substrates.

The thus obtained solid type light control cells were observed by an optical microscope. It was observed that the needle-like particles were oriented and agglomerated to form columnar blocks aligned in the direction perpendicular to the glass substrate. The minor axial length "a" of the columnar block was about 2 μm, and the major axial length of the columnar block was about 20 μm which was approximately equal to the spacing 24 μm between the substrates.

One of the cell substrates was fixed and the other was connected to a probe of an actuator to provide light controlling devices controllable with voltage change.

The transmittance of the devices was measured in the absence of a shear stress and in the presence of a shear stress applied to shift the substrate by about 30 μm.

Figure 7:
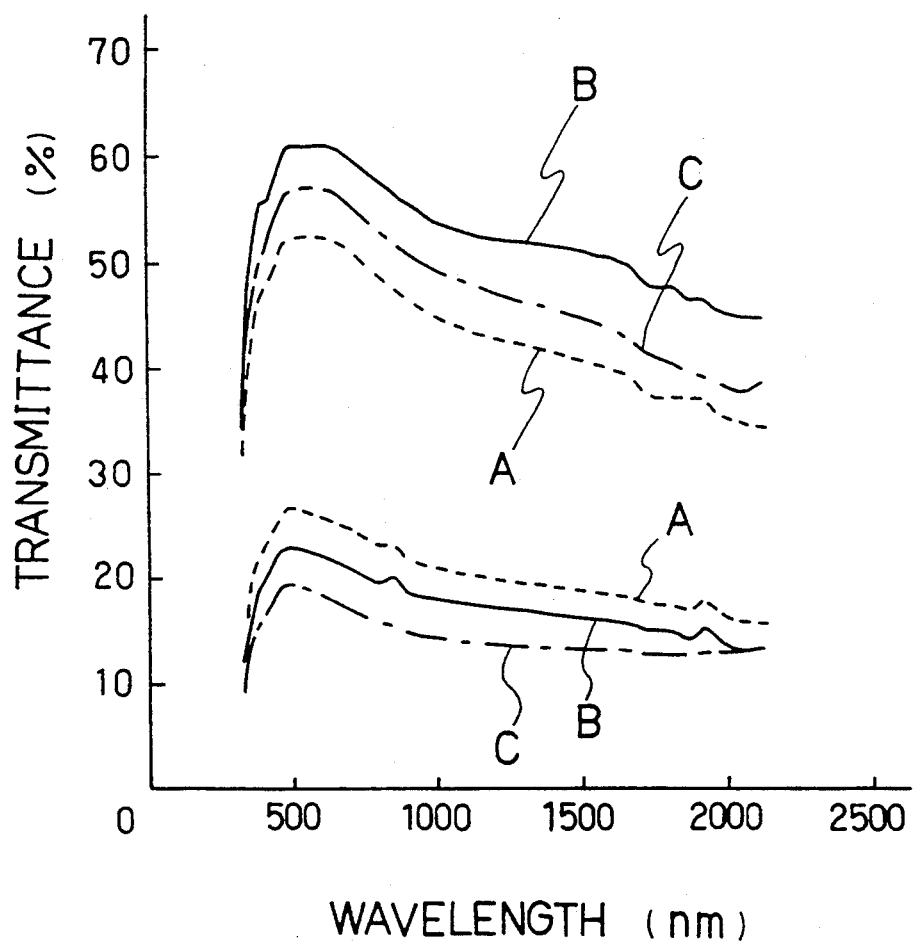
FIG. 7 is a graph showing a change in light transmittance between the stress on state and the stress off state of light controlling devices according to the present invention with or without a particle deposition preventing layer.

The results are shown in FIG. 7 wherein A, B, C show devices using the non-treated substrate (A) and the treated substrates (B) and (C), respectively.

It is observed in FIG. 7 that with respect to all devices, the transmittance remarkably decreases in the region from visible rays to near infrared rays by applying a shear stress between the substrates.

It is also observed that the transmittance in the absence of a shear stress is increased by surface-treating substrates with a polyorganosiloxane and the transmittance is far decreased by the application of a shear stress as compared with the device using the non-treated substrate (A) and, as a result, the width of change in transmittance of sunlight of the devices using the treated substrates (B) and (C) is larger than the width of change 22.2% of the device using the non-treated substrate (A). The width of change in transmittance of the device using the treated substrate (B) was 35.6%, and that of the device using the treated substrate (C) was 39.3%.

In observation of the surfaces of substrates by a microscope, it was confirmed that the amount of particles deposited on the substrate surface was decreased by the surface treatment with polyorganosiloxanes. It is considered that the increase of transmittance in the absence of a shear stress is based on the decrease of the deposition of particles. Also, the enhanced decrease of transmittance in the presence of a shear stress is considered to result from an increase of the concentration of particles participating in formation of chains of particles.

EXAMPLE 4

A solid type light control cell was prepared in the same manner as in Example 3 except that the glass substrates having an ITO film were coated with a polyimide by screen printing.

Figure 8:
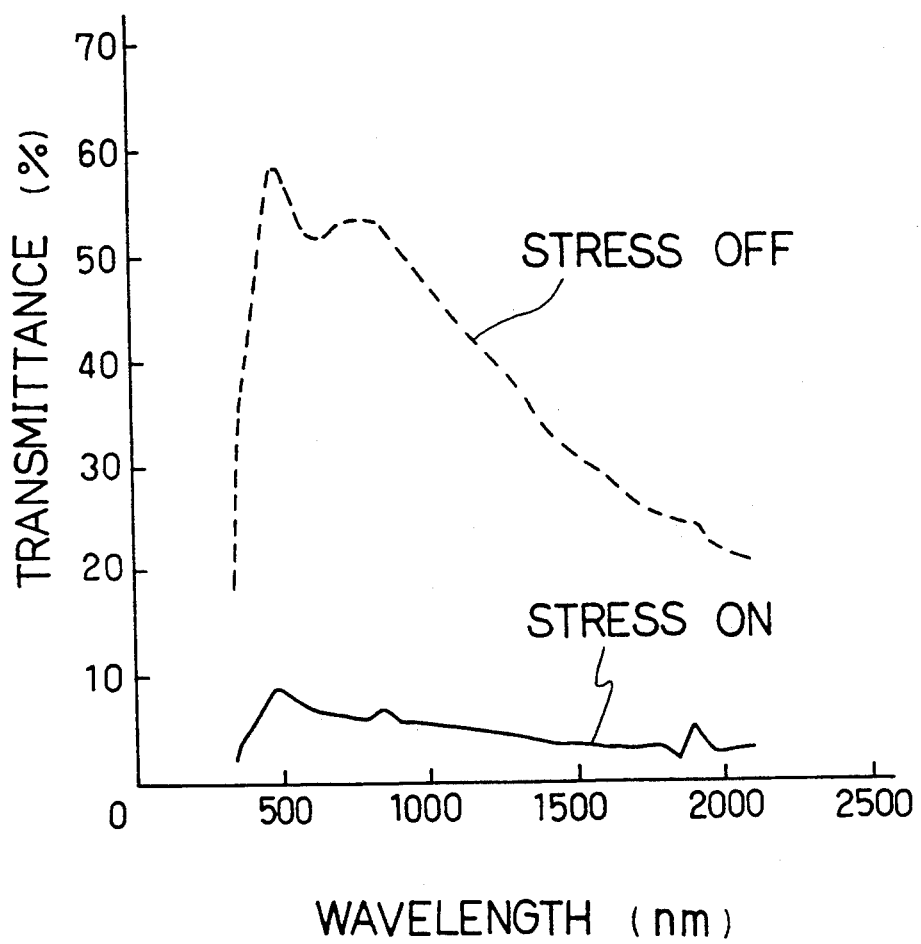
FIG. 8 is a graph showing light transmittance of a light controlling device with a particle deposition preventing layer according to the present invention in the presence and absence of a shear stress.

The transmittance of the cell in the absence of a shear stress and in the presence of a shear stress applied to shift the substrate by about 30 μm was measured. The results are shown in FIG. 8.

The width of change in transmittance is 42.7%, and it would be understood that the width of change is remarkably increased as compared with the width of change 22.2% of the cell using the non-treated substrates.

Further, it was confirmed by microscopic observation of the cell that the amount of particles deposited onto the polyimide-coated substrate was decreased as compared with the non-treated substrate.

In addition to the ingredients used in the Examples, other ingredients can be used in the Examples as set forth in the specification to obtain substantially the same results.

What we claim is:

1. A light controlling device comprising a pair of substrates, a viscoelastic or elastic material containing fine particles interposed between said substrates and aligned in a first predetermined direction with respect to said substrates, and means for intermittently applying a shear stress to said viscoelastic or elastic material and aligning said particles in a second direction.

2. The device of claim 1, wherein said particles are light absorptive particles, light reflective particles or a mixture thereof.

3. The device of claim 1, where said particles are at least one member selected from the group consisting of TiOx (1≦X≦2), TiOxNy (1.37≦x+y≦1.95, 0.15≦y≦0.92), mica covered with TiOx (1≦x≦2), mica covered with TiOxNy (1.37≦x+y≦1.95, 0.15≦y≦0.92), glass flake covered with TiOx (1≦x≦2), glass flake covered with TiOxNy (1.37≦x+y≦1.95, 0.15≦y≦0.92), a metal salt of titanic acid, and TiOxNy covered with silica (1.37≦x+y≦1.95, 0.15≦y≦0.92).

4. The device of claim 1, wherein said particles have a shape anisotropy.

5. The device of claim 1, wherein said viscoelastic or elastic material comprises a crosslinked polymer having a modulus of shearing elasticity of 1×10² to 1×10⁷ dynes/cm² measured at room temperature and 1 Hz, said crosslinked polymer being an inorganic polymer, an organic polymer or a mixture thereof.

6. The device of claim 1, wherein said viscoelastic or elastic material comprises a major amount of a polyorganosiloxane.

7. The device of claim 1, wherein said viscoelastic or elastic material comprises a major amount of a cured product of a heat curable polyorganosiloxane.

8. The device of claim 1, wherein said viscoelastic or elastic material comprises a major amount of a cured product of a photo-curable polyorganosiloxane.

9. The device of claim 1, wherein at least one of said substrates has a layer of preventing deposition of fine particles, said layer being a layer of a material capable of decreasing the surface free energy between said substrate and a liquid suspension of fine particles solidifiable into said viscoelastic or elastic material.

10. The device of claim 9, wherein said particle deposition preventing layer is composed of a member selected from the group consisting of a polyorganosiloxane and a polyimide.

11. The device of claim 9, wherein said particle deposition preventing layer is composed of a polyorganosiloxane selected from the group consisting of a compound of the formula:

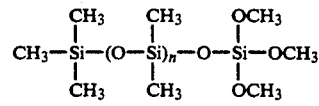

and a compound of the formula:

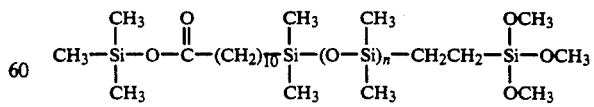

wherein n is an integer.

12. The device of claim 1 wherein said means is attached to one of said substrates.

13. A process for controlling light transmission which comprises intermittently applying a shear stress to a viscoelastic or elastic material containing fine particles aligned in a generally constant first direction and aligning said particles in a second direction.

14. The process of claim 13, wherein said viscoelastic or elastic material is sandwiched with a pair of light transmissive substrates.

15. The process of claim 13, wherein said shear stress is applied in a direction determined in accordance with the direction of incident light to control transmission of light in a desired direction.

16. A light controlling device comprising a pair of substrates, a viscoelastic or elastic material containing fine particles aligned in a predetermined direction with respect to said substrates, and a means for applying a shear stress to said viscoelastic or elastic material,
wherein said particles are at least one member selected from the group consisting of graphite, TiOx ($1 \leq x \leq 2$), TiOxNy ($1.37 \leq x+y \leq 1.95$, $0.15 \leq y \leq 0.92$), mica covered with titanium oxide, mica covered with TiOx ($1 \leq x \leq 2$), mica covered with TiOxNy ($1.37 \leq x+y \leq 1.95$, $0.15 \leq y \leq 0.92$), a metal-coated mica, glass flake covered with titanium oxide, glass flake covered with TiOx ($1 \leq x \leq 2$), glass flake covered with TiOxNy ($1.37 \leq x+y \leq 1.95$, $0.15 \leq y \leq 0.92$), TiOxNy covered with silica ($1.37 \leq x+y \leq 1.95$, $0.15 \leq x \leq 0.92$), a metal-coated glass flake, $\gamma$-iron(III) oxide, a metal salt of titanic acid, iron, cobalt, magnetite, barium ferrite and chromium(IV) dioxide.

17. The device of claim 16, wherein said particles are at least one member selected from the group consisting of TiOx ($1 \leq x \leq 2$), TiOxNy ($1.37 \leq x+y \leq 1.95$, $0.15 \leq y \leq 0.92$), mica covered with TiOx ($1 \leq x \leq 2$), mica covered with TiOxNy ($1.37 \leq x+y \leq 1.95$, $0.15 \leq y \leq 0.92$), glass flake covered with TiOx ($1 \leq x \leq 2$), glass flake covered with TiOxNy ($1.37 \leq x+y \leq 1.95$, $0.15 \leq y \leq 0.92$), a metal salt of titanic acid, and TiOxNy covered with silica ($1.37 \leq x+y \leq 1.95$, $0.15 \leq y \leq 0.92$).

18. A light controlling device comprising a pair of substrates, a viscoelastic or elastic material containing fine particles aligned in a predetermined direction with respect to said substrates, and a means for applying a shear stress to said viscoelastic or elastic material,
wherein at least one of said substrates has a layer of preventing deposition of fine particles, said layer being a layer of a material capable of decreasing the surface free energy between said substrate and a liquid suspension of fine particles solidifiable into said viscoelastic or elastic material.

19. The device of claim 18, wherein said particle deposition preventing layer is composed of a member selected from the group consisting of a polyorganosiloxane and a polyamide.

20. The device of claim 18, wherein said particle deposition preventing layer is composed of a polyorganosiloxane selected from the group consisting of a compound of the formula:

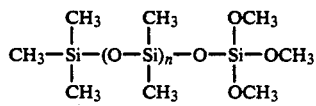

and a compound of the formula:

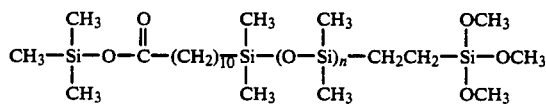

wherein n is an integer.

* * * * *